Aug. 22, 1944.    H. O. PARSONS    2,356,347
DEVICE FOR MEASURING LIQUID LEVELS IN CONTAINERS
Filed Dec. 12, 1942    2 Sheets-Sheet 1

Harrison O. Parsons, INVENTOR.
BY J. D. McKean
ATTORNEY.

Patented Aug. 22, 1944

2,356,347

UNITED STATES PATENT OFFICE 2,356,347

DEVICE FOR MEASURING LIQUID LEVEL IN CONTAINERS

Harrison O. Parsons, Houston, Tex.

Application December 12, 1942, Serial No. 468,758

2 Claims. (Cl. 73—293)

In tank cars or in stationary storage vessels used for the storage of liquids having a substantial vapor pressure, it is desirable to have a means for determining the liquid level in the container without releasing the pressure thereon.

The present invention is directed to a simple rugged device suitable for attachment to storage vessels which will allow an operator to gauge the liquid level in the vessel without opening it to atmospheric pressure. The device of the present invention is suitable for application to a wide variety of purposes such as tank cars, large stationary oil storage tanks and tankers.

The present invention may be described briefly as embracing an assembly comprising a measuring means to be applied to a storage vessel in a vapor tight manner with means for illuminating the liquid surface of the vessel and means allowing the reading of the measuring device.

Figure 1:
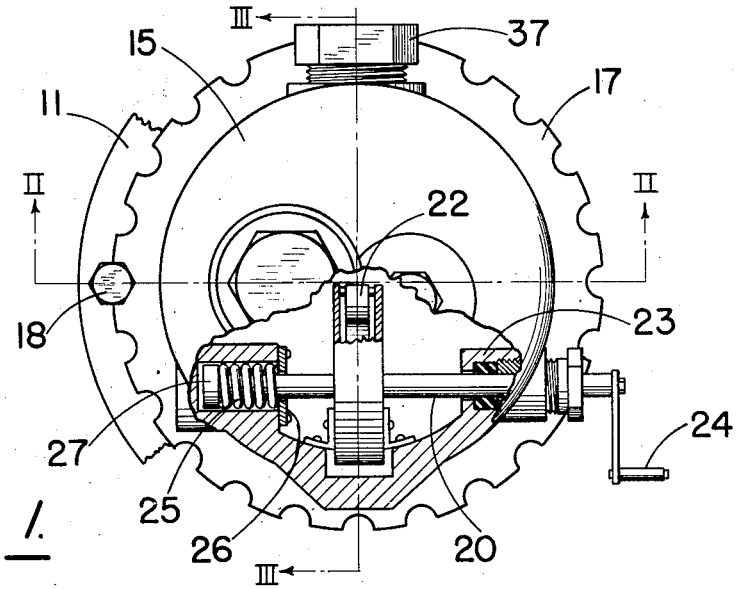
Figure 2:
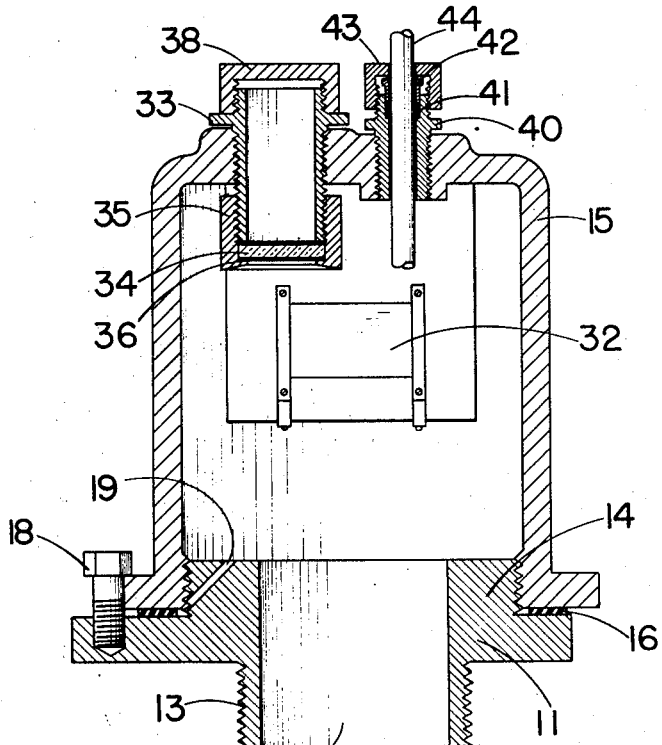
Figure 3:
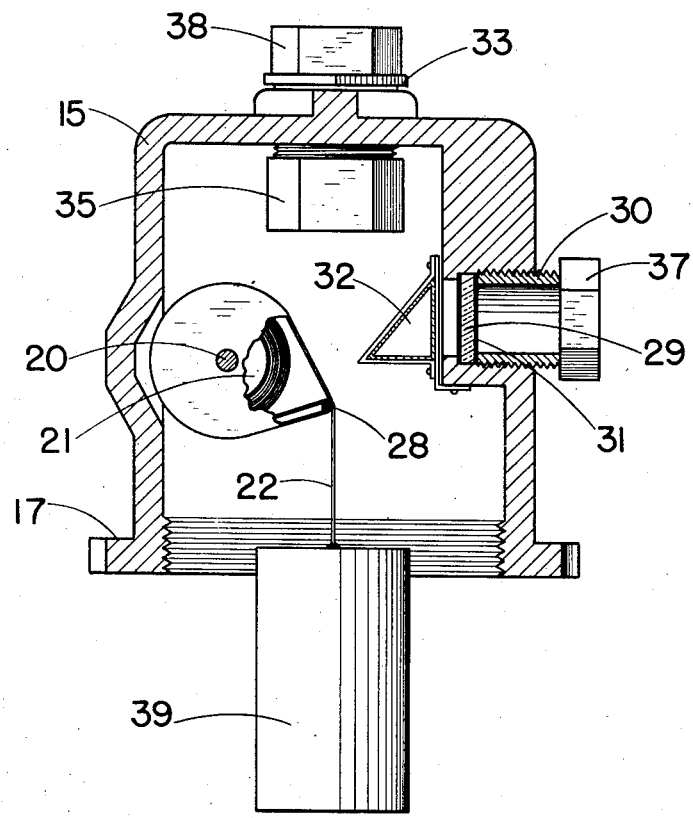

Other objects and advantages of the present invention may be seen from a reading of the following description taken with the drawings in which Figure 1 is an elevation partly in section of a preferred embodiment of the present invention, Figure 2 is a mid-sectional view taken at 90° to that shown in Fig. 1 on line II—II of Figure 1, while Figure 3 is a view partly in section on line III—III of the embodiment of Figure 1.

Turning now specifically to the drawings, a base 11 is provided with a central passage 12, with a downwardly extended threaded abutment 13 adapted to engage mating screw threads of a container, and upwardly an extended threaded abutment 14. A housing 15 is secured in abutment with 14 by mating screw threads with the joint between the members made fluid tight by a suitable gasket 16. The lower portion of housing 15 terminates in an outwardly extending flange 17 provided with a plurality of notches, and relative movement between the housing and base 11 is prevented by a cap screw 18 engaging in base 11 and fitting in a properly aligned notch of flange 17. Base 11 is provided with a vent 19 covered by a lower portion of housing 15 when the two members are screwed together in a fluid tight manner. Vent 19 allows pressure to be released from inside the housing when for any purpose it is desired to disassemble the device and unscrew the housing from the base.

Within housing 15 is mounted spindle 20 on which is mounted spool 21 arranged to carry flexible measuring tape 22. The spindle extends through the wall of the housing through a suitable packing gland 23 and has secured to its exposed end a suitable crank handle 24. It will be understood that this arrangement allows an operator to raise and lower the tape without releasing vapors from the interior of the housing. To prevent the movement of the tape when handle 24 is released, the other end of the spindle may be provided with a suitable breaking means including tension spring 25 and annulus 26 to which the spring is secured and which in turn is attached to the housing, and an annulus 27 secured to the other end of spring 25 and biased against the end of the spindle by the spring. A laterally extending roller 28 is secured in the housing to retain the extended tape in the approximate center of the passage 12.

To allow the illuminating of the interior of the tank, a laterally extending opening is provided in the side of the housing with a means for downwardly deflecting light entering through the opening. A preferred arrangement as shown in the drawings includes a circular piece of glass 29 or similar transparent material held in place by bushing 30 with suitable gaskets 31 sealing the glass to the housing in a pressure tight manner. A triangular prism 32 is mounted within the opening with one of its flat sides parallel with the plane of glass 29, and its other flat side extending horizontally above passage 12 whereby light passing through glass 29, such as might be produced by a flash light, is deflected downwardly through passage 12 and illuminates the interior of the container to which the assembly is attached.

A second opening is arranged in the upper surface of housing 15 and provided with a downwardly extending bushing 33. A circular piece of glass 34 is fitted over the lower end of this bushing and secured thereto in a vapor tight manner by collar 35 and suitable gaskets 36. The arrangement of the two openings at right angles to each other allows light to be transmitted into the container without interfering with an operator's reading of the tape through the upper glass. Both glasses 29 and 34 are set well within the housing, and in addition the bushings holding them in place project behind the outer surface of the housing. This arrangement protects the glass pieces from accidental breakage due to the careless handling of tools by workmen adjacent the assembly. When readings are not being made, the glasses may be additionally protected by caps 37 and 38 engaging mating threads of bushings 30 and 33, respectively.

It is preferred to use the device of the present invention by attaching a suitable float 39 to the end of measuring tape 22 and lowering the tape until the float is buoyant in the liquid. This is preferably determined by an operator placing a flash light adjacent glass 28 while observing through glass 33. If the tape is let out until it is slightly slack and then reeled in until taut, a reading may be taken which will give the exact level of liquid in the container by suitably correcting the reading for the specific gravity of the liquid. To correct the changes of gravity in the liquid the float must have been previously calibrated and a suitable correction made to the reading obtained from the tape. As an example of the correction found necessary when using a copper float 3 inches in diameter, the following table is given:

| Gravity A. P. I. | Add to tape reading |
|---|---|
| | Inches |
| 30 | 2 3/8 |
| 40 | 2 1/4 |
| 50 | 2 5/32 |
| 60 | 2 1/16 |
| 70 | 1 15/16 |
| 80 | 1 13/16 |
| 90 | 1 23/32 |
| 100 | 1 9/16 |

Under certain conditions it may be desirable to make the measurements with a gauge rod rather than with a flexible tape. To provide for the use of such a gauge rod a second opening is arranged in the top of the housing with a bushing 40 secured by suitable screw threads. The bushing is provided with a packing gland comprising packing material 41, follower 42 and cap 43. A suitable gauge rod which may for example be that illustrated in my copending application, Ser. No. 299,461, filed Oct. 14, 1939, and diagrammatically shown herein as member 44 may be arranged for longitudinal movement within the packing gland.

When the gauge rod is not in use it may be retained in position by forcing it downwardly to its fullest extent and tightening cap 42. When it is desired to lower the rod, the cap 42 may be loosened to allow vertical movement without leakage of the vapor from the container. The use of the rod is found particularly desirable in applying the present invention to tank cars. The measuring rod may have a substantially smaller average density than the liquid being loaded so that it will move upwardly as the liquid level rises in the container. The operator at a loading rack may easily observe the position of the measuring rods in a number of tank cars and control the filling of a number of cars simultaneously. It will be understood that if it is not desired to employ a gauge rod in the present invention, as when the assembly is applied to a large stationary storage tank, that the gauge rod and packing gland may be removed and bushing 39 sealed off by means of a cap.

Having fully described the present invention, what I desire to claim is:

1. An assembly suitable for attachment to a container for determining the liquid level therein comprising in combination a housing arranged to be attached to a container, and provided with a side opening and a top opening, a vertical movable calibrated member therein for measuring vertical distances, transparent means arranged in said housing to prevent the flow of fluid through said side opening, a member arranged in said housing to deflect downwardly light entering said opening, a transparent member arranged adjacent said top opening to prevent the flow of liquids therethrough, and to allow an operator to observe the graduations on said measuring member.

2. A device in accordance with the present invention comprising in combination a base arranged for attachment to a container, a housing secured to said base in a fluid tight manner provided with a side opening and a top opening, a laterally extending spindle mounted in said housing with one end extending therethrough, a packing gland secured to said housing and surrounding said spindle to allow rotation thereof while sealing the interior of the housing, a handle secured to the exposed end of said spindle, a flexible graduated tape mounted on said spindle, a transparent member sealed in said side opening to prevent the flow of fluid therethrough, a prism mounted within said housing adjacent said transparent member whereby light entering through said transparent member is deflected vertically downwardly, a transparent member sealed in said top opening to prevent the flow of fluid therethrough, and to allow an operator to read the graduations of said tape.

HARRISON O. PARSONS.